March 6, 1928.

A. ANDERSON

PISTON

Filed Sept. 27, 1926

1,661,917

Inventor.
Albert Anderson
By Mason Fenwick & Lawrence
Attorneys

Patented Mar. 6, 1928.

1,661,917

UNITED STATES PATENT OFFICE.

ALBERT ANDERSON, OF MARQUETTE, NEBRASKA.

PISTON.

Application filed September 27, 1926. Serial No. 137,994.

This invention relates to improvements in piston construction.

A prime object of this invention is to provide a piston which will eliminate the piston slap.

A further object of this invention is to provide a piston which will be simple and inexpensive in construction and at the same time be of a type wherein the stroke may be made as short or long as desired by merely lengthening or shortening one end of the piston.

A further object of this invention is to provide a piston which will not wear as readily as the piston now in ordinary use, and will function in a less noisy manner.

Another object of this invention lies in the utility, particularly wherein it may be possible to compress the air with any desired pressure, and also the connecting rod which will have the very great advantage in this invention of being attached to a wrist pin of large diameter extending through the larger end of the piston.

One of the prime objects in this invention is to provide a piston of integral construction having a large end and a small end, the large end being adapted to receive the connecting rod and wrist pin.

Other objects of this invention will appear from the following detailed description of the device and as disclosed in the single sheet of drawings which is herewith made a part of this application.

Figure 1:
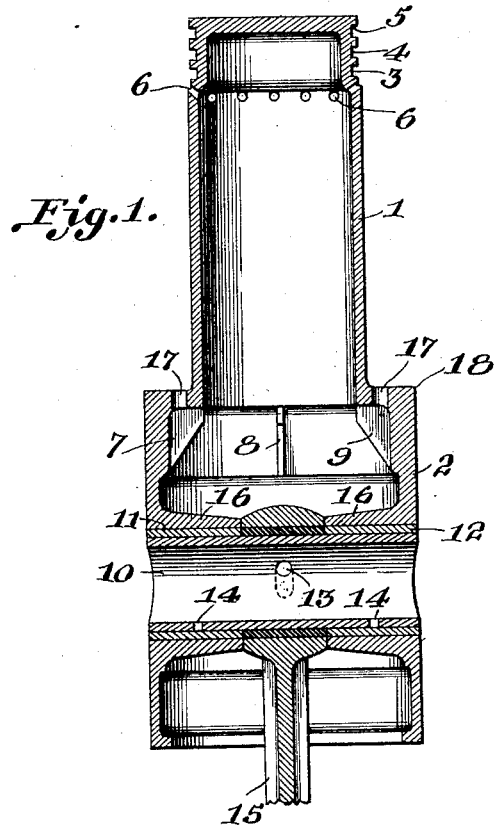
Fig. 1 represents a vertical cross sectional view of the piston disclosing the wrist pin and one end of the connecting rod in assembled relationship thereto.
Figure 2:
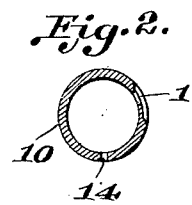
Fig. 2 illustrates a sectional view of the wrist pin.
Figure 3:
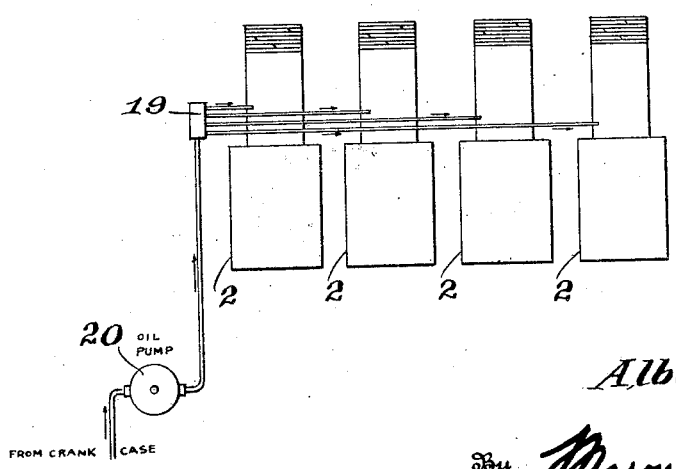
Fig. 3 illustrates a diagrammatic view of an oiling system for the pistons, disclosing an oil force feed as may be desired, running through the distributing block to the pistons.

Numeral 1 designates the smaller end of a hollow piston formed of any suitable material, such as aluminum or lynite, while numeral 2 designates the larger end of the piston construction, suitable ring grooves 3, 4, and 5 are adapted to be located at the outer end of the small portion of the piston 1, also oil holes 6 for properly oiling the piston at this point. The large end 2 of the piston is constructed in such a manner as to give the required strength to the structure particularly approximately at the point where the small and large ends meet.

The strengthening elements consist of suitable portions integrally a part of the piston casting as at 7, 8 and 9; the wrist pin 10 being of considerably larger diameter in comparison to the piston than those in ordinary use, and is adapted to extend through a suitable opening 11 in the larger end 2 of the piston structure, the opening 11 being of sufficient size to include a bushing element 12.

The wrist pin will be constructed having suitable oil holes or openings 13 and 14. A connecting rod 15 is adapted to be suitably positioned in combination with the wrist pin 12 in the usual manner. The large end 2 of the piston is preferably provided with inwardly extending flange portions 16 for the purpose of firmly holding the wrist pin and connecting rod in operative position, thereby providing an exceptionally strong and durable construction, free from the undesirable effects of ordinary wear.

In order to allow free action for the compression and provide means for additionally oiling the piston, suitable holes 17 are located in the shoulder portion 18 of the piston construction. It is readily apparent that a plurality of these pistons may be arranged in a block along ordinary lines, leaving at least one inch between the sleeve portions of the piston 2. If desired an oil force feed may be provided running through the distributing block 19 through which the oil may be pumped from the crank case by means of a pump 20, in the usual manner.

This invention provides a piston which will function to eliminate piston slap, a common cause for the ineffiecient functioning of pistons in ordinary use. It is apparent also that the stroke may be made as short or long as desired by merely lengthening or shortening the small end 1 of the piston. It is estimated that the wear will not be as great in the use of the piston by fifty per cent as in those of common construction. The noise, ordinarily so disturbing, will be practically eliminated and the air may be compressed under any pressure desired.

It is apparent also that the allowable use of a wrist pin having a large diameter in this construction, is highly efficient aiding materially in positively guiding the piston and avoiding, to a great extent, the piston slap.

What I claim is:

1. A hollow piston comprising a large and small end section, a wrist pin having a diameter approximately one-third that of the large section in the large section for carrying a connecting rod, reinforcing elements within the piston between the large and small sections, suitable openings in the large section for allowing compression to escape and through which the piston may be lubricated.

2. A hollow piston comprising a large and small end section, a wrist pin having a diameter approximately one-third that of the large section, a bushing for the wrist pin, suitable inwardly extending flange portions within the large section for firmly holding the wrist pin and connecting rod in operative position in the large section for carrying a connecting rod, reinforcing elements within the piston between the large and small sections, suitable openings in the large section for allowing compression to escape and through which the piston may be lubricated, piston ring grooves at the outer end of the small section.

In testimony whereof I affix my signature.

ALBERT ANDERSON.